United States Patent [19]

Kaiser et al.

[11] 4,378,715
[45] Apr. 5, 1983

[54] APPARATUS FOR KEEPING OPEN THE GAP CUT BY A SAW IN A WORK PIECE

[75] Inventors: Gerhard Kaiser, Metzingen; Eric Spieth, Gomaringen, both of Fed. Rep. of Germany

[73] Assignee: Gustav Wagner Maschinenfabrik, Reutlingen, Fed. Rep. of Germany

[21] Appl. No.: 363,075

[22] Filed: Mar. 29, 1982

[30] Foreign Application Priority Data

Apr. 2, 1981 [DE] Fed. Rep. of Germany ....... 3113356

[51] Int. Cl.³ ............................................. B23D 47/04
[52] U.S. Cl. ......................................... 83/113; 83/107; 83/118; 83/175; 83/176; 83/27
[58] Field of Search ................. 83/113, 107, 175, 118, 83/102, 176, 27

[56] References Cited

U.S. PATENT DOCUMENTS

| 3,170,349 | 2/1965 | Weinkle | 83/175 X |
| 3,709,075 | 1/1973 | Goellner | 83/107 X |
| 3,752,023 | 8/1973 | Allison et al. | 83/113 X |
| 3,978,747 | 9/1976 | Lyon | 83/175 X |
| 4,143,567 | 3/1979 | Kaiser et al. | 83/113 |

Primary Examiner—Donald R. Schran
Attorney, Agent, or Firm—W. G. Fasse; D. H. Kane, Jr.

[57] ABSTRACT

The gap cut by a saw blade into a work piece is kept open behind the saw blade by work piece engaging clamping jaw portions on each side of the blade. For this purpose, each clamping jaw includes, in addition to the clamping pressure applying power drive, a further power drive which permits moving the respective work piece engaging clamping jaw portion independently of the clamping pressure applying power drive and in a direction extending substantially perpendicularly to the direction of movement of the clamping pressure applying power drive.

3 Claims, 3 Drawing Figures

APPARATUS FOR KEEPING OPEN THE GAP CUT BY A SAW IN A WORK PIECE

CROSS-REFERENCE TO RELATED APPLICATIONS

The present application is based on German Ser. No. P 31 13 356.8, filed in the Federal Republic of Germany on Apr. 2, 1981. The priority of the German filing date is claimed for the present application. Our earlier U.S. Pat. No. 4,143,567 issued on Mar. 13, 1979 is related to the present disclosure.

BACKGROUND OF THE INVENTION

The present invention relates to an apparatus for keeping open the gap cut by a saw in a work piece. More specifically, the invention relates to an apparatus for clamping a work piece in a metal saw, especially a circular metal saw.

Prior art clamping devices for clamping a work piece such as sectional steel in a saw are not entirely satisfactory for preventing that the gap formed by the advancing saw blade tends to become narrower as a result of tensions within the work piece which are released due to the formation of the saw blade gap. As soon as the saw blade has sufficiently advanced into a work piece, especially in the form of a large block, the released tension forces may narrow the saw blade gap to such an extent that the saw blade may be pinched by forces which can become large enough to exceed the drive power of the sawing apparatus, whereby the saw blade may be stopped altogether.

Our earlier U.S. Pat. No. 4,143,567 corresponding to German Pat. No. 2,641,255 describes an apparatus which aims at avoiding the above described problem. The clamping apparatus according to our earlier U.S. Pat. No. 4,143,567 comprises a rear clamping jaw or abutment member and two front clamping jaws arranged opposite the rear abutment member, but laterally spaced relative to a plane passing through the saw blade and through the rear abutment member. Each front clamping jaw is provided at its work engaging front face with edges or conical points. The front clamping jaws are displaced laterally relative to the saw blade in a slidable manner and against the force of strong biasing springs. The clamping jaws are operable by hydraulic piston cylinder means. Each of the two front clamping jaws has a supporting body with a slanting surface. The slant angle is within the range of 45° to 75° relative to the plane defined by the saw blade. The two slant angles for the two front clamping jaws are arranged mirror-symmetrically relative to the central plane defined by the saw blade. The work piece engaging portions of the front clamping jaws are pressed laterally apart in accordance with the geometric conditions established by the slant angles, whereby the spreading force components resulting from the clamping forces tend to move the clamping jaws axially outwardly away from the saw blade. As a result, the saw blade gap has a tendency to widen as the saw blade keeps advancing into the work piece. At least, the gap does not diminish in its width. When the two front clamping jaws are released, the spring members have a tendency to return the work piece engaging front portions of the jaws into a starting position.

The just described clamping apparatus according to U.S. Pat. No. 4,143,567 leaves room for improvement in the following respects. Due to the geometric arrangement of the slanting angles the spreading force component or rather components are determined by these angles and by the applied clamping force. Thus, the spreading force components which are derived from the clamping force, can be increased only by further increasing the clamping power which is directed perpendicularly to the longitudinal axis of the work piece. However, from a practical point of view the clamping power cannot be increased at random without becoming economically unfeasible.

OBJECTS OF THE INVENTION

In view of the above it is the aim of the invention to achieve the following objects singly or in combination:

to improve an apparatus of the type described above in such a manner that the lateral spreading forces are independent of the clamping pressures which are applied to the work piece perpendicularly to the longitudinal axis of the work piece;

to provide means for adjusting the spreading forces independently of the clamping forces or pressures; and to make sure that the width of the saw blade gap is maintained at all times to such an extent that the saw blade cannot be pinched by the tensions which are released during the progress of the saw blade gap formation.

SUMMARY OF THE INVENTION

According to the invention there is provided an apparatus for keeping open the gap cut by a saw in a work piece, especially a circular saw blade in which the work piece engaging members or portions of the front clamping jaws are operatively connected to independently operable piston cylinder means. These piston cylinder means are operable independently of the piston cylinder units which apply the clamping pressure or force to the front clamping jaws. Moreover, these independently operable piston cylinder means exert a spreading force component which is effective in a direction perpendicularly to the direction of the clamping force and axially outwardly relative to the longitudinal axis of the work piece.

Preferably, the independently operable piston cylinder means are each subjectable to a fluid under pressure in one or the other direction perpendicularly to the plane defined by the saw blade, whereby the front portions of the clamping jaws may be returned into a starting position after the clamping pressure has been released.

The apparatus according to the invention has the advantage that in addition to the just mentioned positive return of the front portion of the clamping jaws into a starting position, the spreading force is adjustable independently of the clamping force or pressure. Further, under certain circumstances, for example in connection with smaller work pieces, it may not be necessary to apply the spreading forces. In that instance the apparatus according to the invention permits the maintaining of the forward portions of the clamping jaws in a starting position, for example by means of the application of a return pressure or by other suitable means, whereby the feature of the adjustable spreading force may be used or not used as desired.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
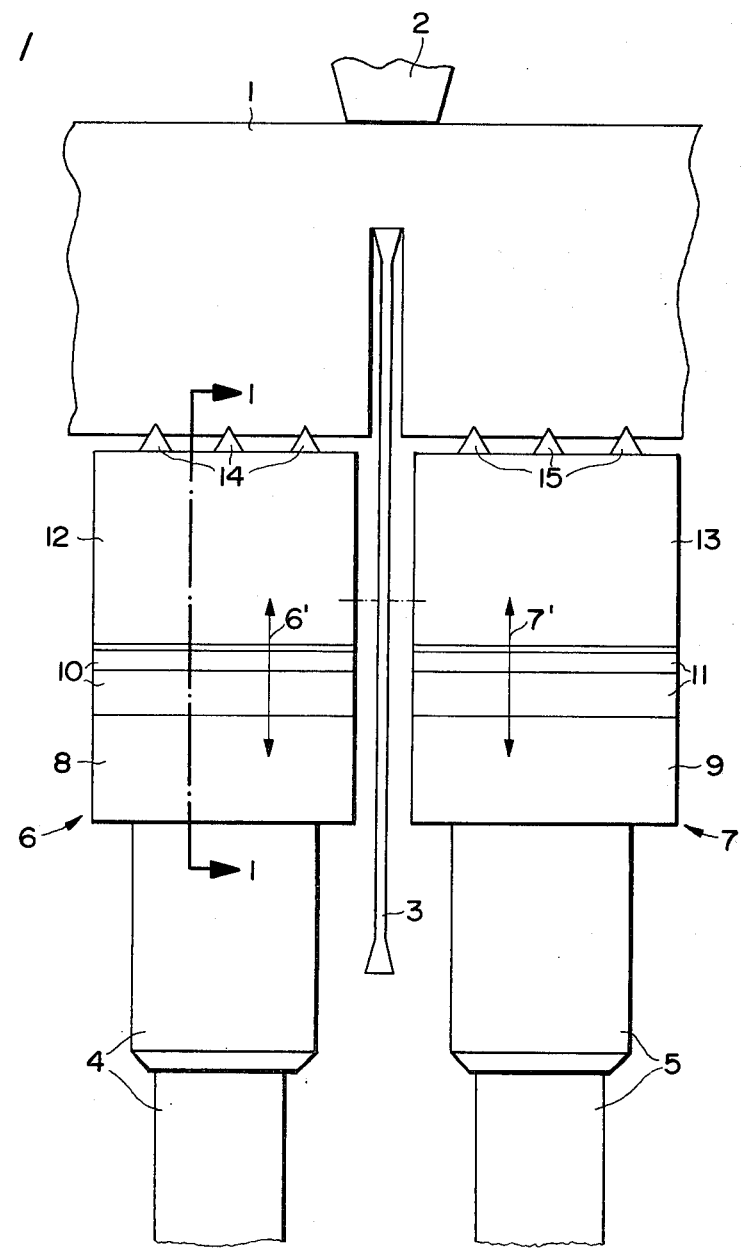
FIG. 1 is a top plan view of a clamping apparatus according to the invention with a work piece clamped in position for cutting by a circular saw blade.

FIG. 1 illustrates a top plan view of a work piece clamping apparatus according to the invention. The work piece 1 is clamped against a stationary rear clamping jaw 2 located centrally relative to a plane defined by the saw blade 3. To the right and left of the saw blade 3 there are arranged two front clamping jaws 6 and 7 which are movable back and forth in the direction of the arrows 6' and 7' respectively under the power of two hydraulic piston cylinder units 4 and 5 respectively. The illustration shows a circular saw blade 3. However, the invention is not limited to a sawing mill using a circular saw blade. The guides for moving the clamping jaws 6 and 7 toward and away from the work piece 1 are not shown for simplicity's sake.

Each clamping jaw 6 and 7 has a lower support portion 8 and 9 as well as an upper work piece engaging clamping portion 12 and 13 respectively. Each clamping portion 12, 13 is provided with clamping points 14, 15 which penetrate into the surface of the work piece under the clamping pressure applied by the hydraulic piston cylinder units 4, 5. Between the support portions 8, 9 and the clamping portions 12, 13 there are arranged flat guide members 10 and 11 which permit a displacement of the upper work piece engaging clamping jaw portions 12, 13 in a direction extending perpendicularly to the plane defined by the saw blade 3 as will be explained in more detail below with reference to FIGS. 2 and 3.

Figure 2:
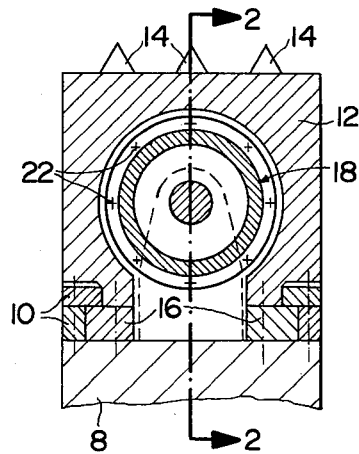
FIG. 2 is a sectional view along section line I—I in FIG. 1.
Figure 3:
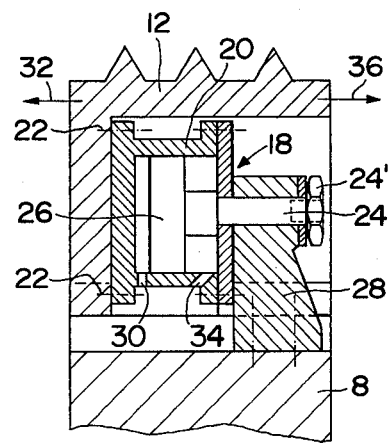
FIG. 3 is a sectional view along section line II—II in FIG. 2.

FIGS. 2 and 3 show only the internal structure of the clamping jaw 6. The internal structure of the clamping jaw 7 is mirror-symmetrically the same as that of the clamping jaw 6. Therefore description of one jaw is sufficient.

The clamping pressure exerted by the piston cylinder unit 4 is transmitted from the lower clamping jaw portion 8 to the workpiece engaging clamping jaw portion 12 through force transmitting bars 16. According to the invention the piston cylinder unit 18 for applying a spreading force and for properly positioning the upper clamping jaw portion 12 is installed inside the jaw portion 12 and held in place by screws 22. The upper clamping portion 12 is movable relative to the lower jaw portion 8 with the aid of flat guide rods 10. Although the piston cylinder unit 18 is shown to be installed inside the upper clamping jaw portion 12, the invention is not limited to such a structure. The piston cylinder unit 18 for applying a spreading force component may also be installed outside the clamping jaw portion 12.

FIG. 3 shows that the piston cylinder unit 18 comprises a cylinder 20 secured to the clamping jaw portion 12 by the screws or bolts 22 and a piston 26 having a piston rod 24 which is rigidly secured to a bearing or support block 28 by means of a nut 24'. Thus, the piston 26 with its rod 24 is stationary relative to the jaw portion 8.

If fluid under pressure is introduced into the port 30 of the cylinder 20, the cylinder 20 and with it the upper jaw portion 12 will move to the left in the direction of the arrow 32. On the other hand, if fluid under pressure is introduced into the port 34, the upper jaw portion 12 will move to the right in the direction of the arrow 36. This is so because the piston 26 is stationary as mentioned. The operation of the right-hand clamping jaw upper portion 13 is mirror-symmetrically the same as that just described for the clamping jaw portion 12.

Although the invention has been described with reference to specific example embodiments it will be appreciated, that it is intended, to cover all modifications and equivalents within the scope of the appended claims.

What is claimed is:

1. An apparatus for keeping open the gap cut by a saw blade in a work piece, comprising fixed abutment means arranged on one side of a work piece, said abutment means being substantially centrally aligned with said saw blade, first and second clamping jaw means arranged substantially opposite said fixed abutment means and spaced laterally on one and the other side of said saw blade, power drive means operatively connected to said first and second clamping jaw means for pressing and moving said first and second clamping jaw means toward and away from said fixed abutment means, each of said first and second clamping jaw means comprising a base portion, a work piece engaging portion and means slidably mounting the work piece engaging portion to the respective base portion for permitting lateral movement of the work piece engaging portion relative to the base portion, and further power drive means operatively connected to the respective work piece engaging portions of the clamping jaw means for laterally moving the respective work piece engaging portion independently of the operation of said first mentioned power drive means and in a direction extending substantially perpendicularly to the direction of movement of said first mentioned power drive means.

2. The apparatus of claim 1, wherein said further power drive means comprise piston cylinder means installed substantially inside in each of said work piece engaging portions of said clamping jaw means.

3. The apparatus of claim 2, wherein each of said piston cylinder means comprise a piston which is held in a stationary position relative to the respective base portion of the clamping jaw means and a cylinder which is rigidly secured to the respective work piece engaging portion of the clamping jaw means for effecting said lateral movement of the work piece engaging portion relative to the respective base portion of the clamping jaw means.

* * * * *